(12) United States Patent
Boulais et al.

(10) Patent No.: US 8,784,704 B2
(45) Date of Patent: Jul. 22, 2014

(54) BROADBAND ARTIFICIAL DIELECTRIC WITH DYNAMICALLY OPTICAL CONTROL

(75) Inventors: Kevin A. Boulais, LaPlata, MD (US); Pearl Rayms-Keller, Fredericksburg, VA (US); Michael S. Lowry, Fredericksburg, VA (US); Francisco Santiago, Fredericksburg, VA (US); Karen J. Long, Upper Marlboro, MD (US); Walter D. Sessions, King George, VA (US); Natasha Laguodas Wilkerson, College Park, MD (US); Reniery Cevallos, King George, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 13/573,279

(22) Filed: Aug. 28, 2012

(65) Prior Publication Data

US 2014/0061507 A1 Mar. 6, 2014

(51) Int. Cl.
*H01B 3/02* (2006.01)
*H01Q 3/44* (2006.01)
*H01Q 15/10* (2006.01)

(52) U.S. Cl.
CPC .............. *H01Q 3/44* (2013.01); *H01Q 15/10* (2013.01); *G02F 2202/01* (2013.01); *G02F 2202/101* (2013.01)
USPC ...................................... 252/600; 250/492.1

(58) Field of Classification Search
CPC ................................ H01Q 3/44; H01Q 15/10
USPC ........ 250/492.1, 570–581; 174/350; 359/321; 361/311; 252/73–74, 570–581; 106/287.25; 501/32, 88, 89, 96.1
See application file for complete search history.

(56) References Cited

U.S. PATENT DOCUMENTS

| | | | |
|---|---|---|---|
| 3,426,209 A * | 2/1969 | Boyd et al. | 250/214.1 |
| 3,971,938 A * | 7/1976 | O'Hare | 250/336.1 |
| 5,662,982 A | 9/1997 | Diaz | 428/116 |
| 6,933,812 B2 | 8/2005 | Sarabandi et al. | 333/219 |
| 7,365,395 B2 | 4/2008 | Stumbo et al. | 257/347 |
| 7,379,030 B1 | 5/2008 | Lier | 343/786 |
| 7,830,310 B1 | 11/2010 | Sievenpiper et al. | 343/700 |
| 8,089,152 B2 | 1/2012 | Miller | 257/746 |
| 8,114,489 B2 | 2/2012 | Nemat-Nasser et al. | 428/34.1 |
| 8,164,401 B2 | 4/2012 | Chang et al. | 333/205 |
| 2003/0230725 A1* | 12/2003 | Wong | 250/372 |
| 2009/0086208 A1* | 4/2009 | Kang et al. | 356/402 |
| 2011/0165405 A1* | 7/2011 | Miller | 428/292.1 |
| 2011/0217544 A1* | 9/2011 | Young et al. | 428/327 |

FOREIGN PATENT DOCUMENTS

JP 2012085145 A * 4/2012 ............... H01Q 9/14

* cited by examiner

*Primary Examiner* — Nicole Ippolito
*Assistant Examiner* — Kevin Chung
(74) *Attorney, Agent, or Firm* — Gerhard W. Thielman, Esq.

(57) ABSTRACT

A material is provided for switching dielectric constant between distinct first and second values responsive to electromagnetic radiation having a specified energy. The material includes a medium transparent to the radiation and a plurality of particulates. Each particulate has a dipole that assumes one of distinct first and second parameters that correspond to the first and second values. The particulates are suspended within the medium. The parameters are either dipole span or charge strength. The dipole of each particulate sets to the first parameter by default and sets to the second parameter in response to the radiation. The particulates can be composed from undoped semi-insulating gallium arsenide. The medium can be polymethylmethacrylate, for example.

23 Claims, 5 Drawing Sheets

US 8,784,704 B2

BROADBAND ARTIFICIAL DIELECTRIC WITH DYNAMICALLY OPTICAL CONTROL

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to synthetically produced dielectric materials. In particular, the invention relates to a broadband artificial dielectric that exhibits dynamic controllability by optical stimulus.

Artificial dielectric concepts have been around at least since 1948, and many applications depend on their principles. Although such materials are generally broadband in nature, they have unalterable values of dielectric constant. Generally, upon formation of the material, the dielectric constant cannot be modified.

SUMMARY

Conventional dielectric materials yield disadvantages addressed by various exemplary embodiments of the present invention. Various exemplary embodiments provide a process to control the value of the dielectric constant dynamically using optical, and/or infrared means. In particular, various embodiments provide a material for switching dielectric constant between distinct first and second values. The material is responsive to electromagnetic radiation having a specified energy, and thereby does not require electrical interconnects. This control response includes continuous and discontinuous alterations between condition states.

Specifically, the material includes a medium transparent to the controlling radiation and a plurality of particulates suspended therein. Each particulate has a dipole that assumes dipole length and charge density values that can be altered by triggering electromagnetic radiation, either to shift along a continuum or switch between bi-static conditions. The dipole of each particulate sets to the first value by default and triggers to the second value in response to the radiation intensity. Each dipole of the particulates aligns to an electric field induced proximate to the medium. In preferred embodiments, the particulates can be composed from undoped semi-insulating gallium arsenide. In additional embodiments, the medium can be polymethylmethacrylate, for example.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
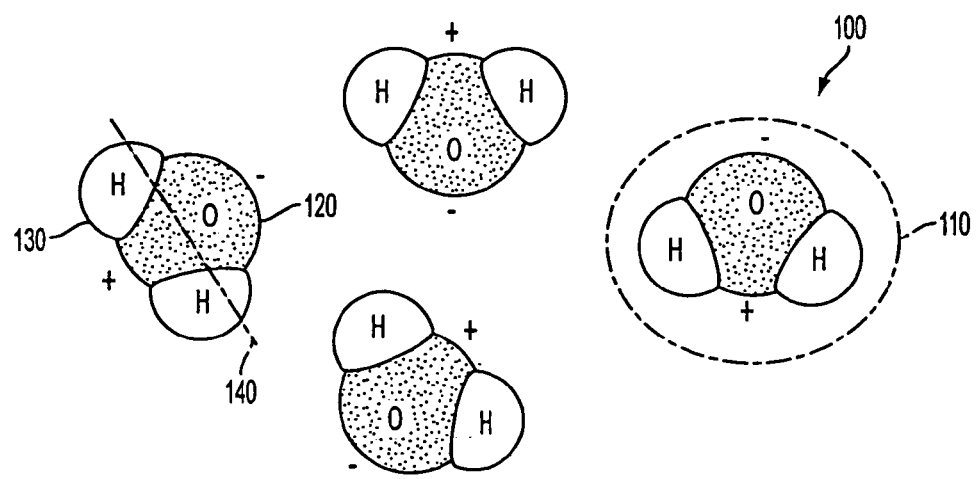
FIG. 1 is a diagram view of water molecules.

Water ($H_2O$) possesses a high dielectric strength. FIG. 1 shows a diagram view 100 of water molecules 110, each having one atom of oxygen 120 and two atoms of hydrogen 130 via covalent bonds. For liquid water, the hydrogen atoms 130 maintain an obtuse separation angle of 106° from the nucleus of the oxygen atom 120.

This asymmetry can be distinguished by a charge plane 140, with the obtuse angle being on the electrically positive (+) side, and the reflex angle being on the electrically negative (−) side. This results from the affinity of the oxygen atom 120 to filling its 2 p shell from electrons shared with the hydrogen atoms 130. The separation in charge across the plane 140, with the positive near the hydrogen atoms 130 and the negative near the oxygen atom 120, form dipole moments. The molecules 110 typically are randomly oriented so the dipole effects naturally cancel out absent an electric field.

Figure 2:
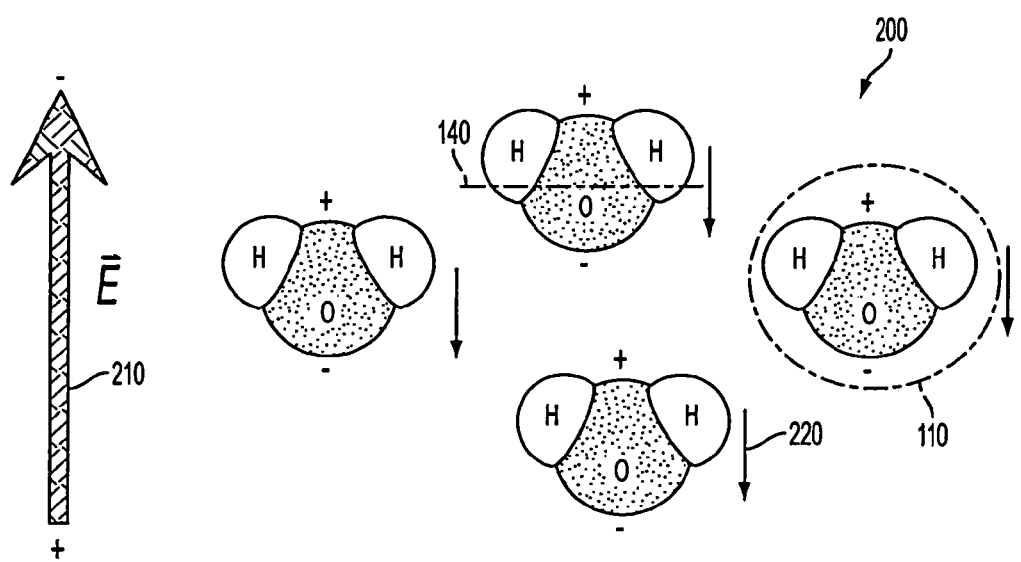
FIG. 2 is a diagram view of water molecules in an electric field.

FIG. 2 shows a diagram view 200 of the water molecules 110 in the presence of an electric field 210. Upon application of this electric field 210, the water molecules 110 rotate such that their dipoles 220 align to oppose the electric field 210. For a material having linear proportionality, the electric displacement $\vec{D}$ is proportional to the electric field $\vec{E}$ by a relative dielectric strength $\in_r$ as:

$$\begin{aligned}\vec{D} &= \varepsilon_0 \vec{E} + \vec{P} \\ &= \varepsilon_0 \vec{E} + \varepsilon_0 \chi \vec{E} \\ &= \varepsilon_0 \vec{E}(1 + \chi) \\ &= \varepsilon_0 \varepsilon_r \vec{E},\end{aligned} \qquad (1)$$

where $\vec{P}$ is the polarization density, $\in_0$ is the permittivity of free space, and $\chi$ is the electric susceptibility.

In exemplary embodiments, an artificial dielectric replaces the molecular dipole 220 with a synthetic dipole, usually consisting of a conducting particle. In this case, the dipoles do not rotate, but instead the charge can reconfigure itself within, or on the surface of the conductor. Often the particles are of nano-size, but can be any size as long as they are much less than the wavelength of the electromagnetic radiation. For example, microwave radiation at 1 GHz has a wavelength of 30 cm, and exemplary particles can be any size less than 10 cm, preferably much smaller, such as on the order of hundreds of micrometers. Particulates can be of any desirable shape depending on purpose. For example, a sphere can be used that can induce an electric effect (permittivity) and a magnetic effect (permeability). To obtain an electric effect only, a disk, flat plate or cylinder (similar in shape to a wire) can be used to suppress electrical currents that would otherwise induce magnetic effects. An article by W. E. Kock: "Metallic Delay Lenses", *Bell System Tech. J.*, 27, 1 (January 1948) at http://www.alcatel-lucent.com/bstj/vol27-1948/articles/bstj27-1-58.pdf describes an example of fixed artificial dielectrics.

Figure 3:
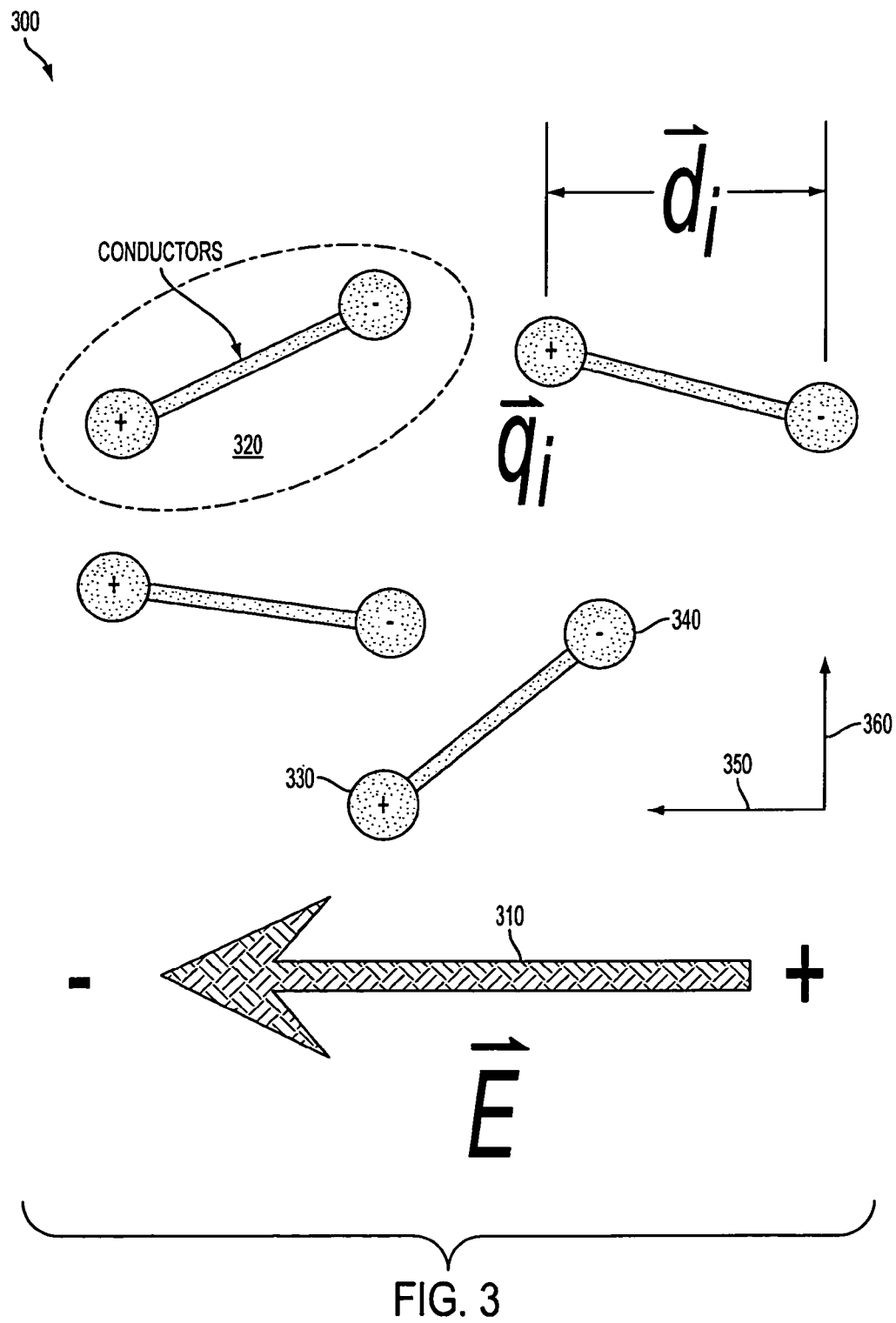
FIG. 3 is a diagram view of artificial dipoles in an electric field.

FIG. 3 shows a diagram view 300 featuring an electric field 310 that envelopes a plurality of synthetic dipoles 320 having corresponding positive charges 330 and negative charges 340. The field 310 can be produced across charged plates, for example. An orientation legend identifies a field co-linear axis 350 and a field transverse axis 360. The conducting particles that contain the dipoles 320 are represented as short wires in this example.

The polarization density of the material can be expressed as:

$$\vec{P} = \sum_{j=1}^{n} q_i \vec{d}_i, \tag{2}$$

where $q_i$ is the charge of each dipole moment, $\vec{d}_i$ is the span or length of each dipole moment in the co-linear direction 350 parallel to the field 310. The polarization density $\vec{P}$ constitutes a summation over all n particulates. Thus, the combination of eqns. (1) and (2) demonstrate how an artificial dielectric behaves.

There exist formularies, e.g., Kock, to describe the behavior of an artificial dielectric. Conventional art describes the behavior of artificial dielectrics for different particle shapes, volumetric densities and other relevant parameters. There also exist formularies to describe dielectric mixing creating an altered dielectric strength as a function of that from the individual components. Some of these formularies are based on fundamental physics, and others parametric. Thus, a binder for composite formulations or laminate structures can include a plurality of materials, and with the addition of the dynamically controllable inclusions, becomes a new dynamically controllable artificial dielectric.

Figure 4:
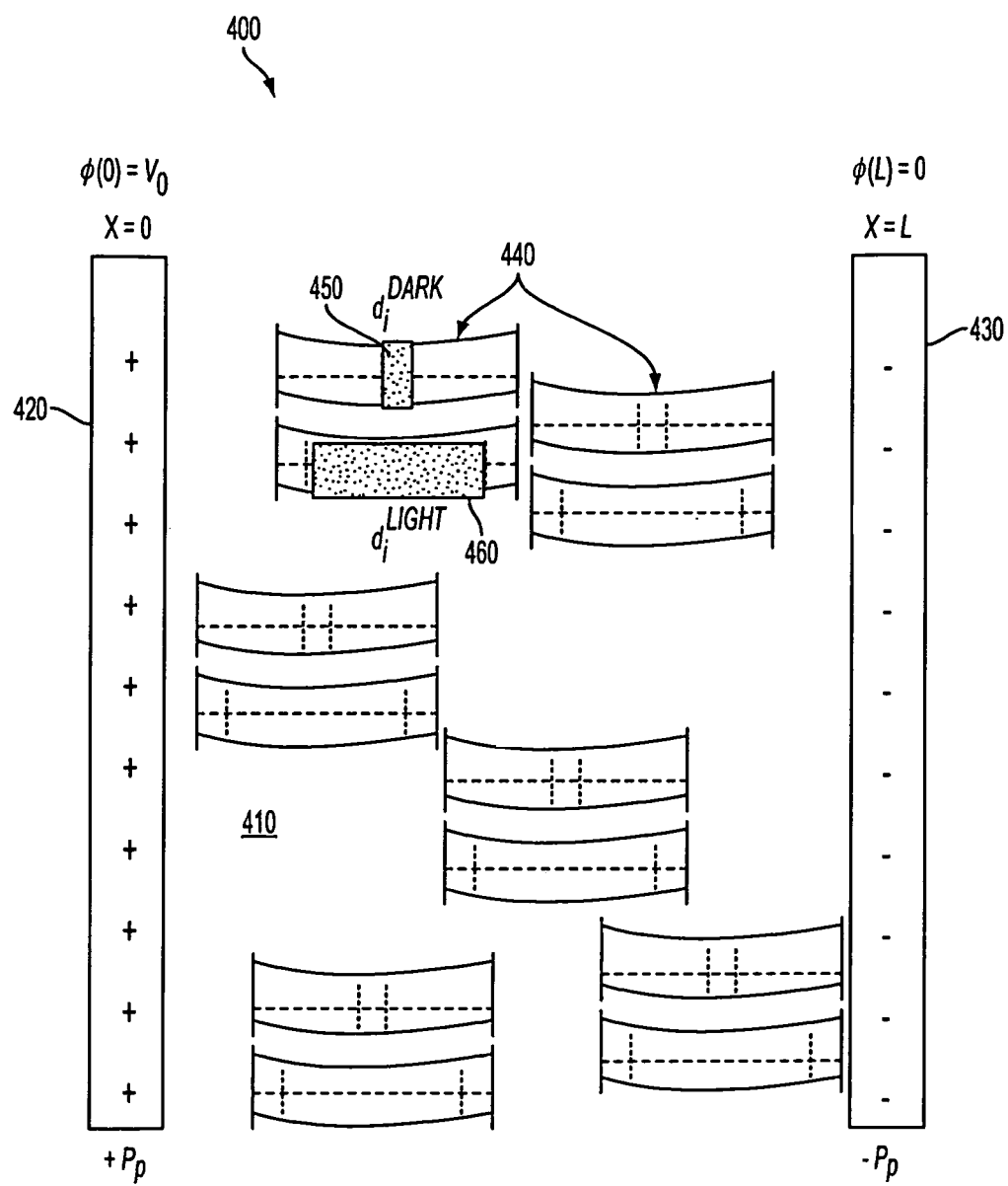
FIG. 4 is a cross-section view of an artificial dielectric capacitor that demonstrates dynamic control of the artificial dielectric.

FIG. 4 shows a diagram view 400 of an artificial dielectric from a dipole suspension matrix 410 disposed between parallel plates 420 and 430 that form a capacitor. The matrix 410 includes particulates or inclusions 440 having binary dipoles 450 and 460 suspended in a medium. A fixed distance L separates left plate 420 at x=0 from right plate 430 at x=L. These plates 420 and 430 are used to measure the dielectric response as a function of electric field strength as induced by an applied voltage. The capacitor potential φ varies spatially between the plates 420 and 430, such that φ(0)=V₀ at the left plate 420 and φ(L)=0 at the right plate 430, producing an electric field $\vec{E}$ perpendicular to the plates 420 and 430.

The inclusions 440 align their controllable dipoles parallel to the electric field $\vec{E}$, and thereby perpendicular to the plates 420 and 430. In the absence of this field (i.e., the plates exhibiting no voltage potential across them), the inclusions 440 revert to having no orientation. In the absence of light stimulation, the inclusions 440 exhibit a semi-insulating state in which the conductivity is small and the region of conductivity has a short span 450; whereas in the presence of that light signal, the inclusions 440 exhibit the dipole's more conductive state, and where the region of conductivity has a long span 460. Such alteration in dielectric effect can be greatly augmented (so as to serve as a continuous and dynamically controllable dielectric, or alternatively as a controllable dielectric switch) by aligning the dipoles of the inclusions 440, which the potential φ across the plates 420 and 430 accomplishes.

Various exemplary embodiments present a process and material product thereof for a producing dynamically controllable artificial dielectric. The material 410 constitutes inclusions 440 contained within a binder. Pulverized undoped semi-insulating (USI) gallium arsenide (GaAs) semiconductor can be used as the inclusions 440 within a binding material transparent to the controlling light. Alternative semiconductors include gallium phosphide (GaP), gallium nitride (GaN) and silicon carbide (SiC). Within the context of this disclosure, the term transparent for a material denotes effective propagation therethrough, and can include optical distortion and photon scatter, such as exemplified by the term translucent. The dipole strength and span of the inclusions, related to charge and charge separation in eqn. (1), change in response to the electromagnetic radiation, which can be microwave, infrared, visible or ultraviolet light.

The binder can be an organic or inorganic substance, provided the binder remains transparent to the electromagnetic radiation (at the defined wavelength) that controls the artificial dielectric, and contains the dispersed inclusions or particulates 440 within a substantially stable matrix 410. The binder that serves as a medium for the suspension matrix 410 can be in solid, gel or liquid form for the inclusions 440 that remain in suspension. Example binders include but are not limited to silica glass ($SiO_3$), magnesium fluoride ($MgF_2$), aluminum oxide ($Al_2O_3$), polymethylmethacrylate (($C_5O_2H_8)_n$, e.g., Lucite, Plexiglas and Perspex), polycarbonate ($C_{16}H_{14}O_3$, e.g., Lexan, Makrolon), water ($H_2O$) and glycine (amino acid $NH_2CH_2COOH$).

The controllable artificial dielectric (exemplified by the suspension material matrix 410) can be fabricated to be isotropic or anisotropic. This dielectric can be fabricated to be homogeneous or non-homogeneous with respect to the electromagnetic radiation. The shape, size and volumetric density of the inclusions 440 can be modified according to desired properties. Although primarily an electric response material, long inclusions 440 (i.e., having axial or planar aspect ratios) can quench magnetic response while substantially spherical type inclusions 440 would maximize any magnetic response, for example.

The capacitance C of a parallel plate capacitor as shown in the view 400 is given by:

$$C = \frac{\varepsilon_r \varepsilon_o A}{L}, \tag{3}$$

where L is the plate separation and A is the plate area (fringing fields being neglected for clarity). The capacitance C is proportional to the dielectric constant of the material matrix 410 between the plates 420 and 430. Thus, a dynamically controllable dielectric constant creates a dynamically controllable capacitance.

Each USI particulate or inclusion 440 between the plates 420 and 430 represents a light-controllable volume of charge within the material matrix 410. From eqn. (2), the electromagnetic radiation modifies the dipole charge $q_i$ and/or the dipole length $\vec{d}_i$ based on the energy of the controlling radiation (expressed as light), geometry of the particles, dielectric value of the binder and volumetric fill factor.

In the view 400, energy band diagrams, shown as spans 450 and 460, are depicted over the top of the USI inclusions 440. The short span 450 represents a dark, or near dark band value of free charge that is very short, or infinitesimal. As the sample is illuminated, charge accumulates from the center of the inclusions 440, which then lengthen and strengthen the dipole 310 corresponding to the long span 460. This influences the effective dielectric strength of the material 410. The selectable shift from short to long energy bands enables continuous variability of the dielectric response.

Figure 5:
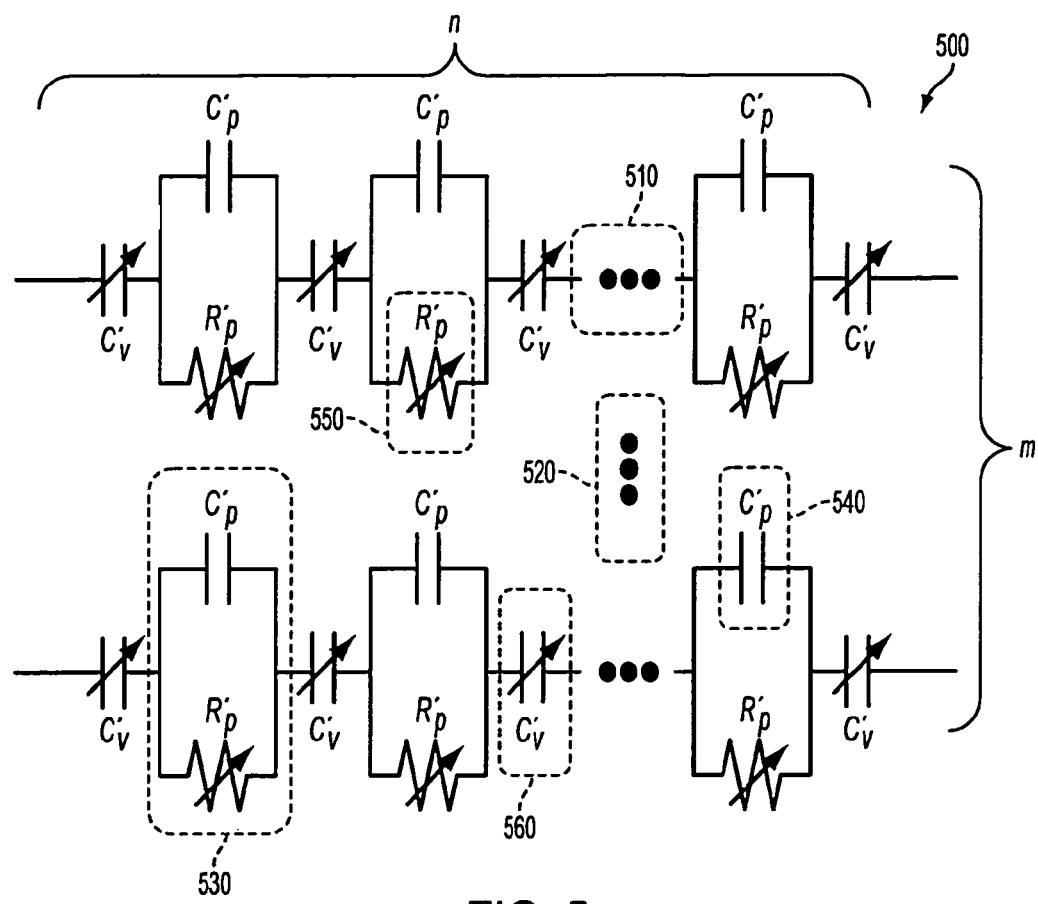
FIG. 5 is an electrical schematic of a resistance-capacitor circuit to model a dynamically controllable broadband artificial dielectric.

FIG. 5 shows an electrical schematic view 500 of a resistor-capacitor (RC) model for the dynamically controllable artificial dielectric as an array of m rows 510 and n columns 520. This model represents an exemplary illustration for the operating mechanisms, and does not define or typify all cases. Each inclusion 440 can be represented as an RC node 530 by a model particulate capacitor $C_p'$ 540 and resistor $R_p'$ 550 that act to strengthen the dipoles. The void (e.g., binder) between the inclusions 440 is mainly represented by a model void capacitor $C_v'$ 560. Diagonal arrows indicate light-variable components. The model void capacitors $C_v'$ 560 also include the light controllable depletion capacitance within the inclusion 440 that effectively lengthens their dipoles when illuminated.

The inclusions 440 are shown in an array to have m rows and n columns but need not be so ordered in practice. The model capacitors and resistors can be defined such that:

$$C_p' \equiv C_p \frac{n}{m}, \tag{4}$$

$$R_p' \equiv R_p \frac{n}{m}, \tag{5}$$

and $$C_v' \equiv C_v \frac{(n+1)}{m}, \tag{6}$$

where $C_p$, $R_p$ and $C_v$ respectively represent inclusion capacitance, particulate resistance and binder capacitance, such that subscript p represents inclusion and subscript v represents binder, and for the capacitor includes variable depletion capacitance near the surface, but within the inclusion 440.

Thus, the dielectric's circuit in schematic view 500 can be reduced to a Thevanin equivalent circuit from series capacitance and resistance expressed as:

$$C = \frac{C_p C_v}{C_p + C_v \frac{(\omega \tau_p)^2}{1+(\omega \tau_p)^2}}, \tag{7}$$

and $$R = \frac{1}{C_p} \frac{\tau_p}{1+(\omega \tau_p)^2}, \tag{8}$$

where $\tau_p$ represents an independent control parameter and $\omega$ is radiation frequency. The ratio parameter $\tau_p$ can be altered by photo-doping, thereby changing the parallel resistivity $R_p$, and can further be expressed as the particulate resistance-capacitance product:

$$\tau_p = R_p C_p \tag{9}$$

The connection to the variable dielectric between the parallel plates 420 and 430 behaves according to eqn. (3) the dielectric strength can be rewritten as:

$$\varepsilon_r = \frac{CL}{\varepsilon_0 A}. \tag{10}$$

There are two effects that cause the artificial dielectric to change value: first photo-doping that changes $R_p$ that in turn changes $\tau_p$, and second by optically changing the depletion capacitance which affects $C_v$. Either mechanism, or both, can be used to shift the dielectric constant. $\tau_p$ can be varied effectively from a maximum value $\tau_p \gg 1$ that depends on semi-insulator material resistivity in a dark environment to some minimum value $\tau_p \gg 1$ for high intensity light. Thus, the corresponding change in dielectric can range from:

$$\varepsilon_{r,min} = \frac{C_p d}{\varepsilon_0 A}, \tag{11}$$

to $$\varepsilon_{r,max} = \frac{C_v d}{\varepsilon_0 A}. \tag{12}$$

This maximum range is achievable for the case that $C_p \ll C_v$ and can be modified through the particle volumetric ratio and/or the dielectric constants of the binder material relative to the particulates. Variability does not require exploiting this maximum range, and smaller ranges can be used.

The second mechanism is a reduction of the depletion width within the semiconductor due to an increase in charge near the depletion edge. This effectively changes the dipole length but in the model in view 500 is seen as increasing the value of $C_v$. These effects are one-in-the-same and the use of one or the other depends on viewpoint. Which mechanism dominates can be chosen through the volumetric ratio of the particulates within the sample. If the void between the particles are large, then the variation in $C_v$ has minimal influence, for example, and the effect primarily results from changes in $\tau_p$. If the voids are small (i.e., short distances between the inclusions 440 within the matrix 410), then the dielectric change stems from a combination of mechanisms.

A particularly attractive aspect of various exemplary embodiments is that for photo-doping, the response of the artificial dielectric material does not vary with electric field strength. Thus, the matrix 410 has a linear response to the electromagnetic radiation being controlled by the artificial dielectric, and so precludes harmonic distortions. A second attractive aspect of these embodiments enables resistance loss to be made very low for high frequencies $\omega$ as illustrated by eqn. (8). A third attractive aspect involves resonance non-dependence with the electromagnetic radiation frequency. In a fourth attractive aspect, the mechanisms to control the artificial dielectric also enable control of artificial magnetic response, or permeability. This occurs because controlling $R_p$ enables flow of a dynamically and continuously variable current (both in conductivity and current loop size) in response to a magnetic field, or in other words, a magnetic dipole. As previously mentioned, whether the material matrix 410 has mainly a dielectric response, or mainly a magnetic response, or both can be determined by shape of the inclusions 440.

From theory known in the art of semiconductor physics, the control of the charge operates through deep level traps. The deep level traps over standard electron-hole pair generation have the benefit of controllability of the absorption rate of the light. Thicker materials might be designed to include fewer traps in the inclusions 440. However, materials without deep level traps can alternatively be used.

Figure 6:
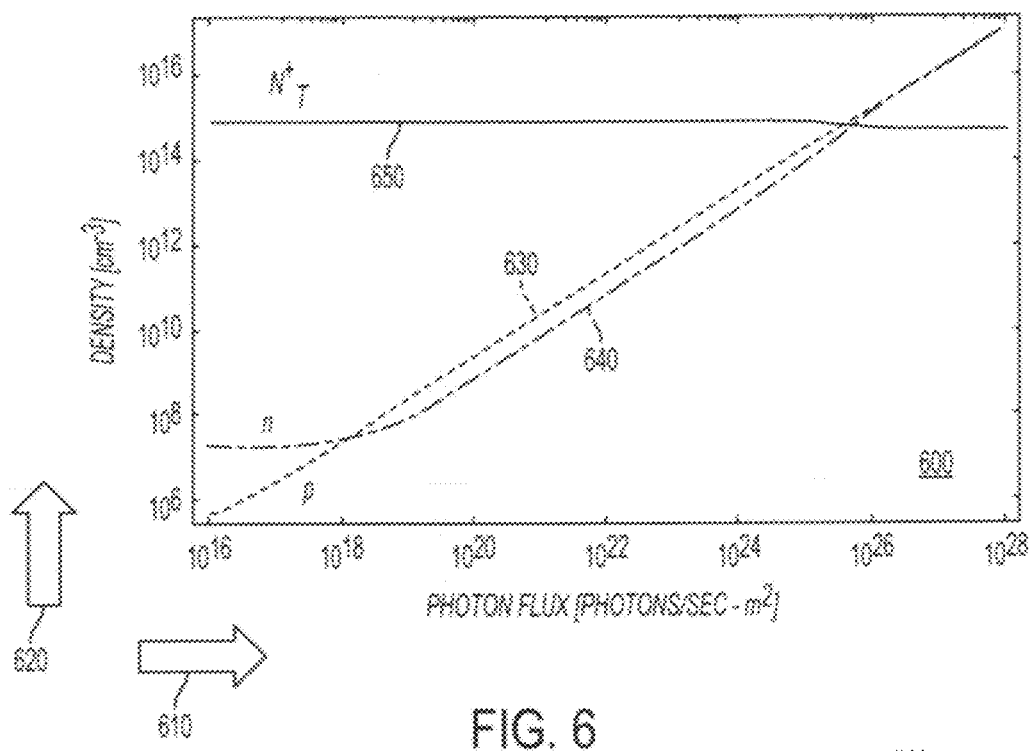
FIG. 6 is a plot view of USI charge density.

FIG. 6 shows a plot view 600 of the charge densities typical of USI inclusions 440 under illumination by a photon flux of sufficient photon energy to excite the traps. Typical shallow donors and acceptors are omitted for clarity. The abscissa 610 represents photon flux rate as the independent variable, and the ordinate 620 represents density as the dependent variable. The abscissa ranges from $10^{16}$ to $10^{28}$ photons-per-second-meter-squared, and the ordinate ranges from $10^6$ to $10^{16}$ inverse cubic centimeters. The graph depicts three curves: p curve 630 for density of free holes, n curve 640 for density of free electrons, and $N_+^T$ curve 650 for the ionization density of the deep level traps.

Figure 7:
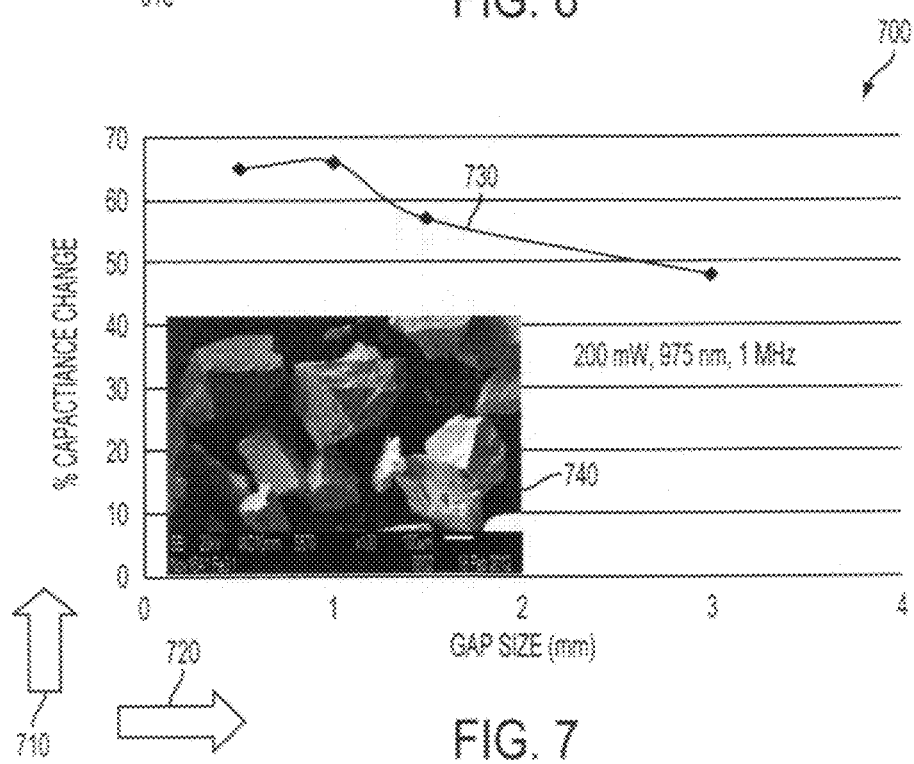
FIG. 7 is a plot view of capacitance change induced by its dynamically controllable broadband artificial dielectric.

Exemplary embodiments depend on constituent parameters such as particulate size and volume density in a way similar to non-controllable artificial dielectrics. There is also a dependence of the constituent parameters due to the active nature of the USI inclusions 440. FIG. 7 shows a plot view 700 of the percentage change of capacitance for inclusions 440 on the order of several hundred microns as a function of a capacitance gap size. The abscissa 710 represents gap size in millimeters, and the ordinate 720 represents percent capacitance change. The gap size denotes separation distance L between the parallel plates 420 and 430. An empirical trend curve 730 plots this percent change against gap size for polymethylmethacrylate (PMMA), diminishing from 65% at about 0.5 mm to 48% at about 3 mm.

Capacitance is proportional to the dielectric strength from eqn. (3) and may be used to determine the dielectric constant at low frequencies. For the curve 730, the probe frequency was 1 MHz, and the percentage change was between infrared light with a wavelength of 975 nm and intensities between 0 mW and 200 mW. The data reveal that the dielectric constant changes by up to 66% and not less than 47% in the range evaluated. Optimization of the constituent parameters can further enhance the change in capacitance.

Exemplary embodiments can be used as a dynamically controllable artificial dielectric in applications that require dynamic control of the dielectric strength. The advantage of an artificial dielectric includes properties beyond those of natural materials, and can be broadband in nature and thus have minimal dispersive loss. Other embodiments can exhibit narrowband ranges that nonetheless would be broader than a low-loss (high-Q) resonance material.

Dynamically controllable artificial dielectrics can be used in bulk form towards components that are based on Fermat's principle in which light is controlled to minimize the optical path through the material, and in accordance to a prescribed and controllable index of refraction. Thus, the path can be changed in a dynamic and controllable way. The inclusions 440 in artificial dielectrics are generally randomly placed within the suspension matrix 410. The inclusions 440 can also be disposed in periodic arrangement.

Exemplary embodiments can be used in a metamaterial so as to behave in a controllable manner. Particulates and inclusions 440 in metamaterials are generally disposed in a periodic arrangement. One typical deficiency of metamaterials involves being inherently narrowband in operating range due to the use of a resonant structure to enhance the magnetic response of the material. In exemplary embodiments, the formulation and technique enable modifying the electric response. However, the magnetic response can also be influenced using non-resonant techniques.

Such particulate and binder materials can be envisioned to produce a low cost controllable metamaterial on a large scale. Scrap or surplus USI semiconductors can be utilized for the pulverized material, thereby greatly reducing cost for example. The materials can be used in broadband and narrowband dynamically tunable artificial dielectric or metamaterial applications. The material can be used isotropically or anisotropically. The material can be fabricated homogeneously or non-homogeneously. The material can have an electric and/or magnetic response.

Over the past century and increasingly today, the United States armed forces have become dramatically dependant on applications of EM radiation. EM applications are found in communications, guidance, search and track, sensing and others. Metamaterials offer techniques for fabricating materials with properties that extend beyond those found in nature to provide strategists with original solutions to EM problems of present and future interest. Making an EM material controllable in a dynamic way permits applications that might involve cloaking, reduced antennae size, new kinds of lenses and others.

So far as known, a conventional material with a dynamically controllable index of refraction based on the broadband properties of artificial dielectrics does not exist. The advantages and new features for exemplary embodiments include:
1. The material represents a bulk form of an artificial dielectric in which the dielectric constant can be dynamically controlled to change the path of electromagnetic radiation through the material in a controlled way. Such bulk materials are used for "optics" based on Fermat's principle, for example.
2. An advantage of controlling a dielectric response is its broadband response, as opposed to tunable synthetic artificial electromagnetic materials that tend to be based on resonance to achieve reasonable magnetic or electric polarizations.
3. A dynamically controllable artificial dielectric possesses an instantaneous broadband nature.
4. The material can be made low cost based on pulverized scrap active materials, such as USI GaAs.
5. The material can be low cost due to low cost binders such as a polymer-based matrix (e.g., PMMA).
6. The material can be used as a dynamically controllable artificial dielectric in which the particulates are arranged in basically a random fashion.
7. The material can be used as a dynamically controllable metamaterial that is broadband so as to arrange the particulates in a substantially periodic fashion.
8. The material can be fabricated to be isotropic or anisotropic in relation to the electromagnetic radiation.
9. The material can be fabricated homogeneous or inhomogeneous in relation to the electromagnetic radiation.
10. The material can be fabricated to have a desirable average overall dielectric strength, and also a controllable dielectric strength that is independent of the average dielectric strength.
11. The material response can be made linear to avoid harmonic distortions.
12. The material can be made low-loss for high frequency applications.
13. The material dielectric response can change rapidly due to stimulated electron and hole generation, as well as stimulated and/or spontaneous absorption of electrons and holes.
14. The dielectric of the material can be either varied across a continuum (i.e., continuously) or else switchable between bi-static values.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A material for varying dielectric constant between distinct first and second values responsive to electromagnetic (EM) radiation having a specified energy, said material comprising:
   a medium transparent to the EM radiation; and
   a plurality of particulates, each particulate having a dipole that assumes one of distinct first and second parameters that correspond to the first and second values, said plurality being suspended within said medium, wherein
   said dipole of said each particulate sets to said first parameter by default and sets to said second parameter in response to the EM radiation, and
   said particulates are composed from at least one of gallium arsenide, gallium phosphide, gallium nitride and silicon carbide.

2. The material according to claim 1, wherein said first and second parameters are respectively dipole span and charge strength.

3. The material according to claim 1, wherein the dielectric constant varies continuously between the first and second values.

4. The material according to claim 1, wherein the dielectric constant switches bi-statically between the first and second values.

5. The material according to claim 1, wherein each said dipole of said plurality of particulates aligns to an electric field induced proximate to said medium.

6. The material according to claim 1, wherein said particulates are composed from undoped semi-insulating (USI) gallium arsenide.

7. The material according to claim 1, wherein said medium is composed from one of silica glass, magnesium fluoride, aluminum oxide, polymethylmethacrylate, polycarbonate, water and glycine.

8. A device for switching dielectric constant between distinct first and second values responsive to electromagnetic (EM) radiation having a specified energy, said device comprising:
   an electric field source;
   a medium transparent to the EM radiation within said source; and
   a plurality of particulates, each particulate having a dipole that assumes one of distinct first and second parameters that correspond to the first and second values, said plurality being suspended within said medium, wherein
   said dipole of said plurality of particulates sets to said first parameter by default and sets to said second parameter in response to the EM radiation, and
   said particulates are composed from at least one of gallium arsenide, gallium phosphide, gallium nitride and silicon carbide.

9. The device according to claim 8, wherein said first and second parameters respectively dipole span and charge strength.

10. The device according to claim 8, wherein the dielectric constant varies continuously between the first and second values.

11. The device according to claim 8, wherein the dielectric constant switches bi-statically between the first and second values.

12. The device according to claim 8, wherein said source includes first and second parallel plates with a charge potential across said plates.

13. The device according to claim 8, wherein said particulates are composed from undoped semi-insulating (USI) gallium arsenide.

14. The device according to claim 8, wherein said medium is composed from one of silica glass, magnesium fluoride, aluminum oxide, polymethylmethacrylate, polycarbonate, water and glycine.

15. A method for varying dielectric constant between distinct first and second values responsive to electromagnetic (EM) radiation having a specified energy, said method comprising:
   providing a medium transparent to the EM radiation;
   suspending a plurality of particulates within said medium, each particulate having a dipole that assumes one of distinct first and second parameter that correspond to the first and second values, wherein said dipole of said plurality of particulates sets to said first parameter by default and sets to said second parameter in response to the EM radiation and said particulates are composed from at least one of gallium arsenide, gallium phosphide, gallium nitride and silicon carbide; and
   inducing an electric field source proximate to said medium for aligning said dipole of said each particulate.

16. The method according to claim 15, wherein said first and second parameters are respectively dipole span and charge strength.

17. The method according to claim 15, wherein the dielectric constant varies continuously between the first and second values.

18. The method according to claim 15, wherein the dielectric constant switches bi-statically between the first and second values.

19. The method according to claim 15, further comprising:
   controllably emitting the EM radiation to said medium for altering the dielectric constant from the first value to the second value.

20. The method according to claim 19, further comprising:
   controllably terminating the EM radiation to said medium for altering the dielectric constant from the second value to the first value.

21. The method according to claim 15, wherein said source includes first and second parallel plates with a charge potential across said plates.

22. The method according to claim 15, wherein said particulates are composed from undoped semi-insulating (USI) gallium arsenide.

23. The method according to claim 15, wherein said medium is composed from one of silica glass, magnesium fluoride, aluminum oxide, polymethylmethacrylate, polycarbonate, water and glycine.

* * * * *